(12) United States Patent
Arihara

(10) Patent No.: US 10,677,644 B2
(45) Date of Patent: *Jun. 9, 2020

(54) DYNAMIC CHARACTERISTIC MEASUREMENT DEVICE OF CENTRIFUGAL ROTATION MACHINE, AND CENTRIFUGAL ROTATION MACHINE

(71) Applicant: Kobe Steel, Ltd., Hyogo (JP)

(72) Inventor: Hirotoshi Arihara, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 186 days.

This patent is subject to a terminal disclaimer.

(21) Appl. No.: 15/942,133

(22) Filed: Mar. 30, 2018

(65) Prior Publication Data

US 2018/0274971 A1 Sep. 27, 2018

Related U.S. Application Data

(62) Division of application No. 14/434,950, filed as application No. PCT/JP2013/080676 on Nov. 13, 2013, now Pat. No. 9,964,435.

(30) Foreign Application Priority Data

Nov. 19, 2012 (JP) ................................. 2012-253257

(51) Int. Cl.
*G01H 17/00* (2006.01)
*F04D 1/06* (2006.01)
(Continued)

(52) U.S. Cl.
CPC ............... *G01H 17/00* (2013.01); *F04D 1/00* (2013.01); *F04D 1/06* (2013.01); *F04D 15/0088* (2013.01);
(Continued)

(58) Field of Classification Search
CPC .......... F04D 15/0088; F04D 1/00; F04D 1/06; F04D 17/10; F04D 17/12; F04D 25/163;
(Continued)

(56) References Cited

U.S. PATENT DOCUMENTS 5,717,141 A 2/1998 Kikuchi et al.

FOREIGN PATENT DOCUMENTS

| JP | S55-147329 A | 11/1980 |
| JP | S55147329 A | 11/1980 |

(Continued)

OTHER PUBLICATIONS

EPO, Description JPS55-147329, retrieved Sep. 13, 2017, pp. 1-3. (Year: 2017).*

(Continued)

*Primary Examiner* — Moshe Wilensky
*Assistant Examiner* — Jesse M Prager
(74) *Attorney, Agent, or Firm* — Studebaker & Brackett PC

(57) ABSTRACT

A dynamic characteristic measurement device of the present invention includes magnetic force generators (1a, 1b, 2a, 2b) arranged on the back surface side of impellers (4, 5), the magnetic force generators that oscillate the impellers (4, 5) with magnetic force, an oscillation controller (12) that drives these magnetic force generators, and vibration sensors (13, 14) that detect vibration of a rotation shaft (3). The dynamic characteristic measurement device further includes an arithmetic device (16) that calculates a dynamic characteristic of a rotor (6) by implementing a frequency analysis and a mode analysis based on an oscillation signal from the oscillation controller (12) and a vibration signal from the vibration sensors (13, 14).

3 Claims, 12 Drawing Sheets

(51) Int. Cl.
| | |
|---|---|
| *F04D 15/00* | (2006.01) |
| *F04D 27/00* | (2006.01) |
| *G01H 1/00* | (2006.01) |
| *G01M 1/22* | (2006.01) |
| *G01M 7/04* | (2006.01) |
| *G01M 99/00* | (2011.01) |
| *F04D 1/00* | (2006.01) |
| *F04D 17/10* | (2006.01) |
| *F04D 29/66* | (2006.01) |
| *H01F 7/06* | (2006.01) |
| *H01F 7/20* | (2006.01) |
| *F04D 17/12* | (2006.01) |
| *F04D 25/16* | (2006.01) |
| *G01H 3/04* | (2006.01) |
| *G01H 3/10* | (2006.01) |

(52) U.S. Cl.
CPC .......... *F04D 17/10* (2013.01); *F04D 27/001* (2013.01); *F04D 29/66* (2013.01); *G01H 1/006* (2013.01); *G01M 1/22* (2013.01); *G01M 7/045* (2013.01); *G01M 99/00* (2013.01); *H01F 7/064* (2013.01); *H01F 7/20* (2013.01); *F04D 17/12* (2013.01); *F04D 25/163* (2013.01); *F05D 2260/12* (2013.01); *G01H 3/04* (2013.01); *G01H 3/10* (2013.01)

(58) Field of Classification Search
CPC ...... F04D 27/001; G01H 1/003; G01H 1/006; G01H 3/04; G01H 3/10; G01H 17/00; G01M 7/045; G01M 1/22; G01M 99/00; F05D 2260/12; H01F 7/064; H01F 7/20
See application file for complete search history.

(56) References Cited

FOREIGN PATENT DOCUMENTS

| | | |
|---|---|---|
| JP | H03-160194 A | 7/1991 |
| JP | H07-128198 A | 5/1995 |
| JP | H08-145058 A | 6/1996 |
| JP | 2001-173590 A | 6/2001 |
| JP | 2005-233200 A | 9/2005 |
| JP | 2008-190328 A | 8/2008 |
| JP | 2012-082803 A | 4/2012 |
| JP | 2012-172756 A | 9/2012 |

OTHER PUBLICATIONS

International Search Report; PCT/JP2013/080676; dated Jan. 28, 2014.
Written Opinion of the International Searching Authority; PCT/JP2013/080676; dated Jan. 28, 2014.
The extended European search report issued by the European Patent Office dated Jun. 9, 2016, which corresponds to European Patent Application No. 13855612.1-1607 and is related to U.S. Appl. No. 14/434,950.

\* cited by examiner

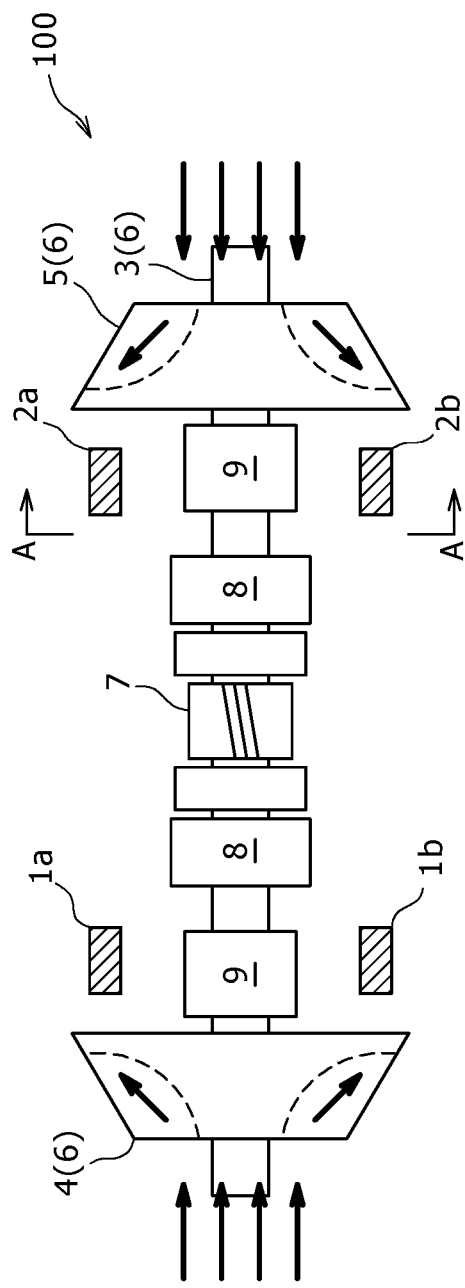
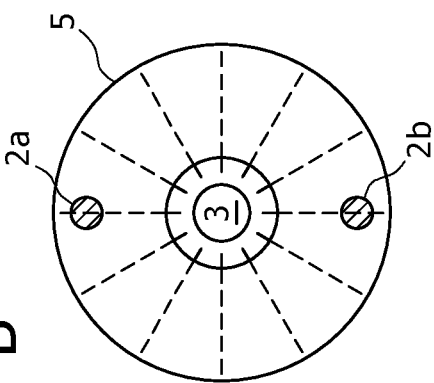
FIG. 1A
FIG. 1B

PHASE STATE A

PHASE STATE B

PHASE STATE C

PHASE STATE D

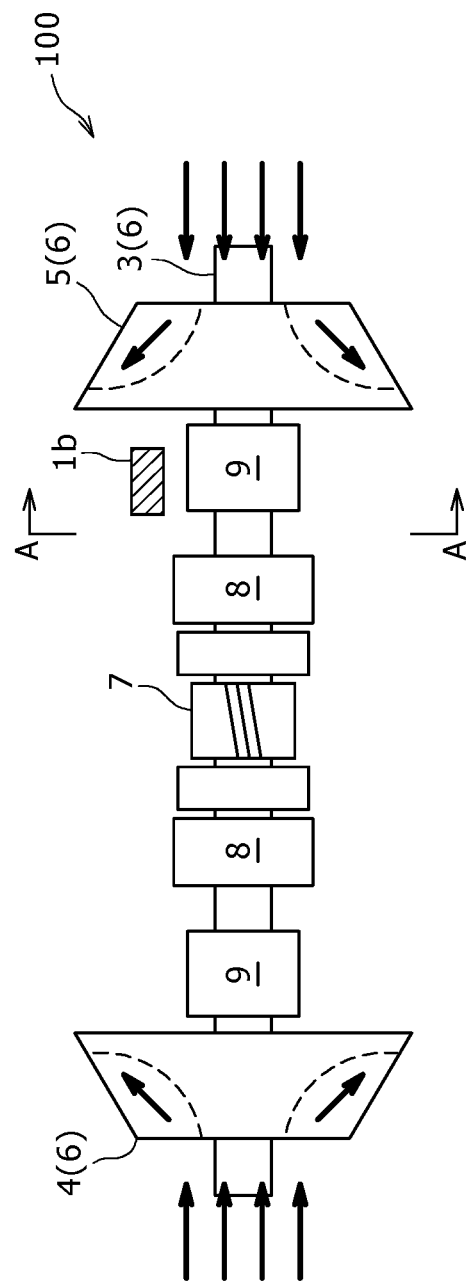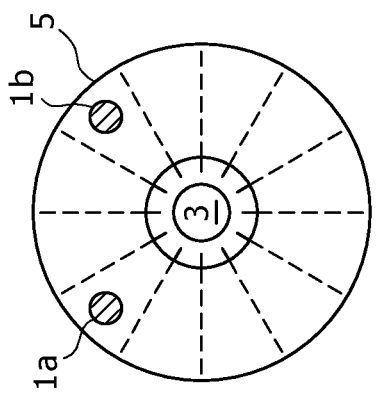
FIG. 4A
FIG. 4B

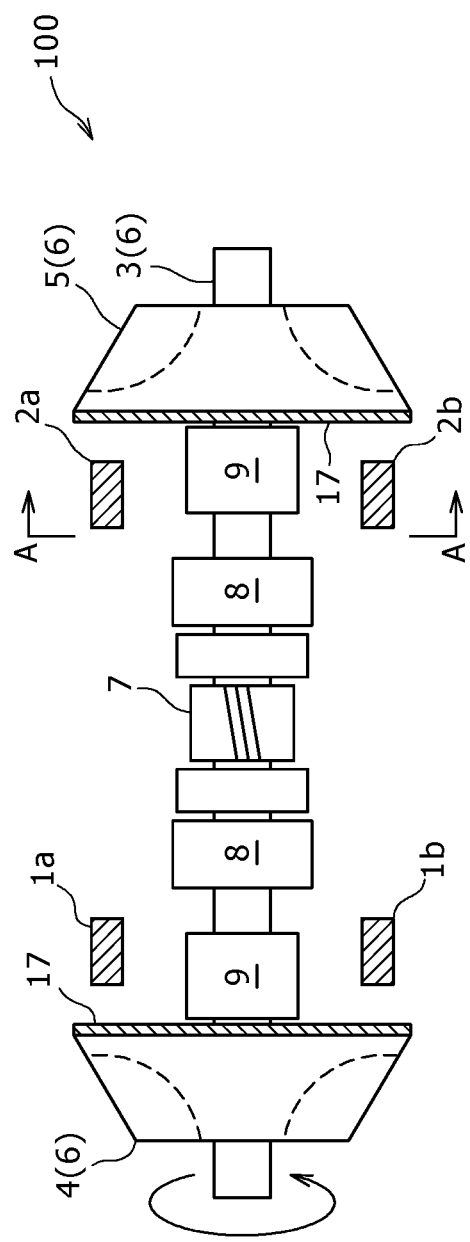
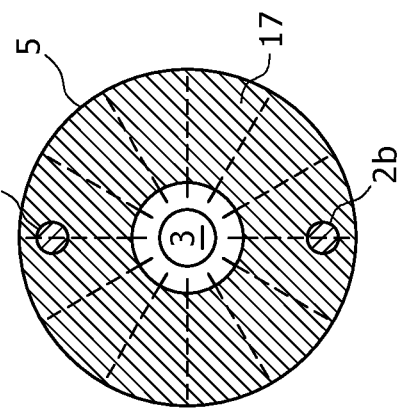
FIG. 12A
FIG. 12B

DYNAMIC CHARACTERISTIC MEASUREMENT DEVICE OF CENTRIFUGAL ROTATION MACHINE, AND CENTRIFUGAL ROTATION MACHINE

CROSS-REFERENCE TO RELATED APPLICATIONS

The present application is a Divisional of U.S. patent application Ser. No. 14/434,950 filed Apr. 10, 2015, which is the U.S. National Phase Entry of International Patent Application No. PCT/JP2013/080676 filed Nov. 13, 2013, which claims benefit of Japanese Patent Application No. 2012-253257 filed Nov. 19, 2012, the entire contents of which are incorporated herein by reference.

TECHNICAL FIELD

The present invention relates to a dynamic characteristic measurement device of a centrifugal rotation machine such as a centrifugal compressor that compresses a gas by rotating an impeller, and a centrifugal rotation machine.

BACKGROUND ART

For example, in a centrifugal compressor, due to excitation force of a high pressure gas acting on a rotor thereof, the rotor causes self-excited vibration, so that the compressor has to be stopped sometimes. In general, in a rotation machine, it is known that large vibration is generated at critical speed where a natural frequency of a rotor thereof and the rotation number of the rotor are matched.

A technique described in Patent Document 1 is a technique whose object is to enable a rotor of a rotation type fluid machine to be operated even in the vicinity of quaternary critical speed. In a uniaxial type centrifugal compressor, a magnetic bearing is installed in a shaft end of a rotor where magnitude of a quaternary vibration mode is large, and generated magnetic force is controlled in such a manner that vibration of the rotor is reduced at the time of passing through the quaternary critical speed.

Patent Document 2 describes a technique for monitoring a state of stability of a shaft vibration system and detecting a sign of abnormal vibration in advance with a configuration that magnetic bearings are provided in both ends of a rotation shaft in a uniaxial type centrifugal compressor. The rotor at the time of operation is oscillated via the magnetic bearings, and a shaft vibration response at the time is detected by a sensor. A transfer function is calculated from an oscillation command and a detected value of the sensor, and a forward rotation mode and a backward rotation mode are separated from the calculated transfer function. From the obtained sensitivity function, a peak value of the mode serving as a monitoring object is read, and by displaying a time change thereof, the stability of the shaft system is monitored.

CITATION LIST

Patent Document

Patent Document 1: JP 8-145058 A
Patent Document 2: JP 2012-82803 A

SUMMARY OF THE INVENTION

Problems to be Solved by the Invention

In any of the techniques described in Patent Documents 1, 2, the magnetic bearing is installed in the shaft end of the rotor. In a case of the uniaxial type centrifugal compressor, the magnetic bearing can be installed in the shaft end of the rotor. However, there is a rotation machine having a structure where a magnetic bearing cannot be installed in a shaft end of a rotor. For example, in a case of a built-in gear type centrifugal compressor, a rotation shaft overhangs on the outer side of a bearing and an impeller is attached to a shaft end of the rotation shaft. In this case, the end of the rotation shaft serves as a flow passage of a compressed gas. Thus, a magnetic bearing cannot be installed in the shaft end of the rotation shaft.

The present invention is achieved in consideration with the above situation, and an object thereof is to provide a dynamic characteristic measurement device of a centrifugal rotation machine capable of measuring a dynamic characteristic of a rotor with high precision while maintaining and ensuring a fluid flow passage of an end of a rotation shaft even when a centrifugal rotation machine including the rotor in which an impeller is attached to the shaft end of the rotation shaft is a dynamic characteristic measurement object for evaluating rotation stability of a shaft system.

Means for Solving the Problems

The present invention is a dynamic characteristic measurement device of a centrifugal rotation machine including a rotor in which an impeller is attached to a shaft end of a rotation shaft. This dynamic characteristic measurement device includes a magnetic force generator arranged on the back surface side of the impeller, the magnetic force generator that oscillates the impeller with magnetic force, an oscillation controller that drives the magnetic force generator, a vibration sensor that detects vibration of the rotation shaft, and an arithmetic device that calculates a dynamic characteristic of the rotor by implementing a frequency analysis and a mode analysis based on an oscillation signal from the oscillation controller and a vibration signal from the vibration sensor.

In another aspect, the present invention is a centrifugal rotation machine including a rotor in which an impeller is attached to a shaft end of a rotation shaft, and the above dynamic characteristic measurement device.

Effects of the Invention

In the present invention, since the magnetic force generator is arranged on the back surface side of the impeller, a fluid flow passage of the end of the rotation shaft can be maintained and ensured. Since the impeller is attached to the shaft end of the rotation shaft in which vibration magnitude is large, oscillation of this impeller with the magnetic force from the magnetic force generator means oscillation of a position where the vibration magnitude of the rotor is large. Thereby, the vibration magnitude of the rotor can be sufficient enough to measure the dynamic characteristic of the rotor. Furthermore, the impeller has a shape of extending from the rotation shaft outward in the radial direction of the impeller. Thus, by oscillating this impeller with the magnetic force from the magnetic force generator, bending moment by the magnetic force is increased. Thereby, effective oscillation in which a shaft vibration response is increased can be achieved. From these, a vibration mode of the rotor for measuring the dynamic characteristic of the rotor can be effectively excited. As a result, the dynamic characteristic of the rotor can be measured with high precision.

In such a way, according to the present invention, even when the centrifugal rotation machine including the rotor in which the impeller is attached to the shaft end of the rotation shaft is a dynamic characteristic measurement object for evaluating rotation stability of a shaft system, the dynamic characteristic of the rotor can be measured with high precision while ensuring the fluid flow passage of the shaft end of the rotation shaft. It should be noted that thereby, the rotation stability of the centrifugal rotation machine can be evaluated with high precision.

BRIEF DESCRIPTION OF DRAWINGS

FIG. 1A is an arrangement view of magnetic force generators forming a dynamic characteristic measurement device according to a first embodiment of the present invention, and FIG. 1B is an AA arrow view of FIG. 1A.

FIG. 4A is an arrangement view of magnetic force generators forming a dynamic characteristic measurement device according to a second embodiment of the present invention, and FIG. 4B is an AA arrow view of FIG. 4A.

FIG. 11A is a graph in which the horizontal axis indicates gas power and the vertical axis indicates a damping ratio; and FIG. 11B is a graph in which the horizontal axis indicates time and the vertical axis indicates the damping ratio.

FIG. 12A is a view showing a mode where plates made of a magnetic body are attached to back surfaces of impellers, and FIG. 12B is an AA arrow view of FIG. 12A.

DESCRIPTION OF EMBODIMENTS

Figure 2A:
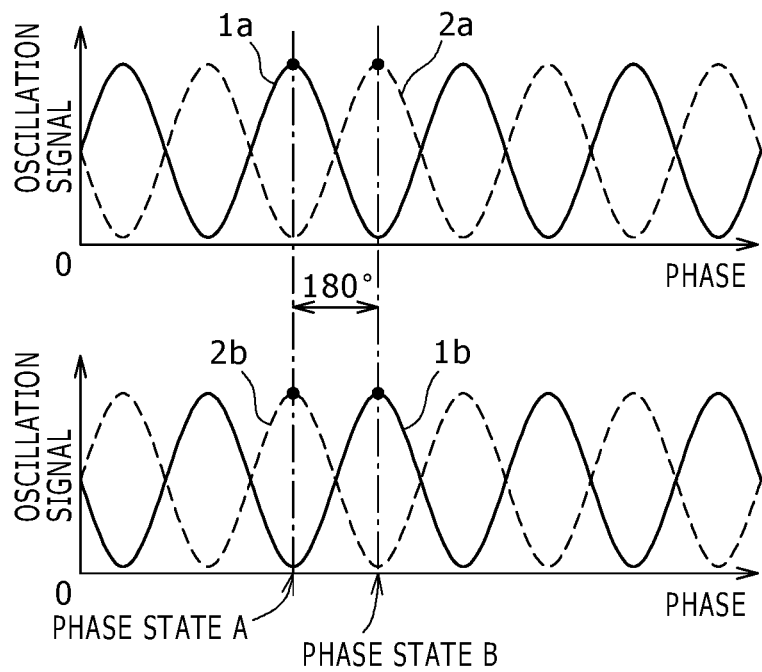
FIG. 2A is a graph showing waveforms of oscillation signals to the magnetic force generators shown in FIG. 1A in a case where a rigid mode is excited.

Hereinafter, embodiments for carrying out the present invention will be described with reference to the drawings.

Hereinafter, an example that a dynamic characteristic measurement device of a centrifugal rotation machine according to the present invention is applied to a built-in gear type centrifugal compressor will be shown. However, the dynamic characteristic measurement device according to the present invention can be applied to various centrifugal rotation machines that compress or pressure-feed a fluid, including a rotor in which an impeller is attached to a shaft end of a rotation shaft. That is, the dynamic characteristic measurement device according to the present invention can measure a dynamic characteristic of a rotor (shaft system) of a centrifugal rotation machine including a rotor in which an impeller is attached to a shaft end of a rotation shaft such as centrifugal compressor, a centrifugal pump, and a centrifugal fan.

First Embodiment

A dynamic characteristic measurement device according to a first embodiment of the present invention will be described with reference to FIGS. 1A to 3C. It should be noted that a system configuration of the dynamic characteristic measurement device and a flow of dynamic characteristic measurement of a rotor will be described in detail in the description of a third embodiment to be described later. Herein, a configuration of a built-in gear type centrifugal compressor serving as one example of a dynamic characteristic measurement object, arrangement of magnetic force generators forming the dynamic characteristic measurement device, and oscillation modes by the magnetic force generators will be described.

<Configuration of Built-in Gear Type Centrifugal Compressor>

As shown in FIG. 1A, a built-in gear type centrifugal compressor 100 includes a rotor 6 having a rotation shaft 3, and impellers 4, 5 respectively attached to both ends of the rotation shaft 3. That is, the rotor 6 is formed by the rotation shaft 3 and the impellers 4, 5. A gear 7 (pinion gear) is provided in the rotation shaft 3 between the two impellers 4, 5. This gear 7 is meshed with a large gear (not shown) having a larger diameter than the gear 7, and the rotor 6 is rotated via the gear 7. A speed increasing mechanism is formed by the gear 7 and the large gear, and rotation speed of the rotor 6 is for example 20,000 to 30,000 rpm.

Bearings 8 supporting the rotation shaft 3 are installed between the two impellers 4, 5 and on both sides of the gear 7. A seal 9 preventing leakage of a compressed gas is installed between the bearing 8 and the impeller 4 (5). It should be noted that the parts such as the rotor 6 are housed in a casing (not shown). One built-in gear type centrifugal compressor often includes a plurality of rotors 6 in which the gear 7, the bearings 8, the seals 9, and the like are incorporated. It should be noted that a built-in gear type centrifugal compressor including only one rotor 6 in which the gear 7, the bearings 8, the seals 9, and the like are incorporated may be used.

<Arrangement of Magnetic Force Generator>

Arrangement of magnetic force generators (1a, 1b, 2a, 2b) forming the dynamic characteristic measurement device will be described. In the present embodiment, the plurality of magnetic force generators (1a, 1b, 2a, 2b) is arranged on the back surface side of the impellers 4, 5 in such a manner that a rigid mode and a bending mode can be separately excited as a vibration mode of the rotor 6. The magnetic force generators (1a, 1b, 2a, 2b) are to oscillate the impeller 4 (5) with magnetic force. It should be noted that a flow of the compressed gas is shown by arrows in FIG. 1A. The back surface of the impeller 4 (5) indicates a surface of the impeller 4 (5) on the opposite side of a surface where the compressed gas flows.

These magnetic force generators (1a, 1b, 2a, 2b) preferably change magnitude of the generated magnetic force by an electric signal. For example, an electric magnet formed by winding a coil around an iron core or the like is suitable. The direction of the magnetic force generators (1a, 1b, 2a, 2b) is for example the direction parallel to the rotation shaft 3. In a case where the electric magnet formed by winding the coil around the iron core is used, the axial direction (longitudinal direction) of the iron core and the axial direction of the rotation shaft 3 are set to be parallel. It should be noted that these directions are not necessarily perfectly parallel. The axial direction (longitudinal direction) of the iron core is placed along the axial direction of the rotation shaft 3. The rotation shaft 3 and the impellers 4, 5 are orthogonal to each other.

A material of the impellers 4, 5 is desirably a magnetic body on which magnetic attractive force acts, or a favorably conductive body in which an eddy current is generated. The magnetic body includes iron and stainless having a magnetic property. The favorably conductive body includes aluminum, an aluminum alloy, and copper.

In a case where the material of the impellers 4, 5 is neither the magnetic body nor the favorably conductive body, a magnetic member made of the magnetic body or a favorably conductive member made of the favorably conducive body may be attached to the back surfaces of the impellers 4, 5. One example of this mode is shown in FIGS. 12A, 12B. In the example shown in FIGS. 12A, 12B, plates 17 made of the magnetic body are attached to the back surfaces of the impellers 4, 5 by welding bonding or the like. It should be noted that thickness of the plates 17 is arbitrary. Although the plates 17 are attached to the entire back surfaces of the impellers 4, 5 in FIGS. 12A, 12B, the plates 17 may be attached only to surfaces of the back surfaces of the impellers 4, 5, the surfaces that face the magnetic force generators (1a, 1b, 2a, 2b). Since the impellers 4, 5 are rotated, in this case, a shape of the plates 17 is a ring shape (annular shape).

Back to FIG. 1A. The magnetic force generators (1a, 1b) are arranged on the back surface side of the impeller 4 at a 180° interval in the rotation direction of the rotor 6. It should be noted that the magnetic force generators (1a, 1b) are not rotated but fixed to the casing or the like. FIG. 1B is an AA arrow view of FIG. 1A.

Figure 2B:
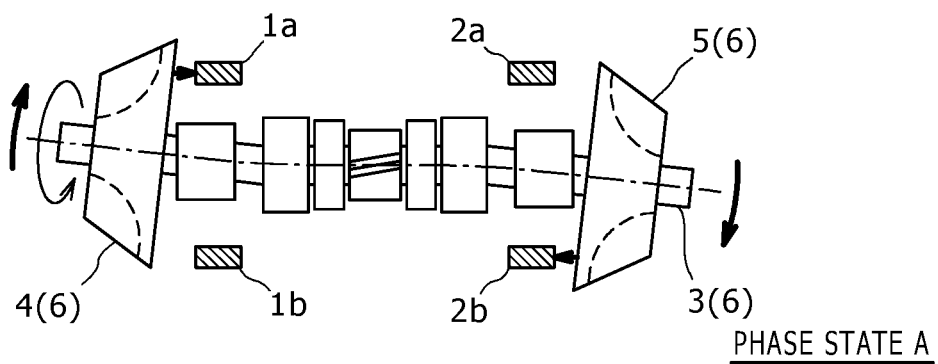
FIG. 2B, FIG. 2C are views showing states of vibration of a rotor when the rigid mode is excited.

Similarly, as shown in FIG. 2B, the magnetic force generators (2a, 2b) are arranged on the back surface side of the impeller 5 on the opposite side of the impeller 4 at a 180° interval in the rotation direction of the rotor 6, and fixed to the casing or the like.

The magnetic force generators (1a, 2a) and the magnetic force generators (1b, 2b) arranged on both the sides of the rotation shaft 3 are arranged to face each other in the axial direction of the rotor 6. In other words, the magnetic force generator 1a and the magnetic force generator 2a are arranged on the substantially same straight line when seen from the axial direction of the rotor 6. The same is applied to the magnetic force generators (1b, 2b). The magnetic force generator 1b and the magnetic force generator 2b are arranged on the substantially same straight line when seen from the axial direction of the rotor 6.

In the radial direction of the rotation shaft 3 (impellers 4, 5), the magnetic force generators (1a, 1b, 2a, 2b) are preferably arranged at positions of the same distance from the shaft center of the rotation shaft 3. Further, the distance from the shaft center of the rotation shaft 3 is preferably as large as possible. That is, the magnetic force generators (1a, 1b, 2a, 2b) are preferably arranged in outermost peripheral parts (outer peripheral edges) of the impellers 4, 5 in the radial direction of the rotation shaft 3 (impellers 4, 5).

The impellers 4, 5 have a shape of extending from the rotation shaft 3 outward in the radial direction of the impellers. Therefore, by oscillating the outermost peripheral parts of the impellers 4, 5 with the magnetic force from the magnetic force generators (1a, 1b, 2a, 2b), bending moment by the magnetic force can be more increased in comparison to oscillation of parts near the rotation shaft 3. As a result, a shaft vibration response is more increased, so that effective oscillation of the rotor 6 can be achieved.

<Oscillation Mode by Magnetic Force Generator>

Next, oscillation modes (the rigid mode and the bending mode) by the magnetic force generators (1a, 1b, 2a, 2b) will be described with reference to FIGS. 2A to 3C.

Firstly, a case where the rigid mode is excited will be described with reference to FIGS. 2A, 2B, 2C. It should be noted that the rigid mode is a vibration mode coming first after starting vibration of the rotor 6, in which bending is small. Meanwhile, the bending mode is a vibration mode coming next to the rigid mode after starting the vibration of the rotor 6, in which bending is relatively large.

Figure 2C:
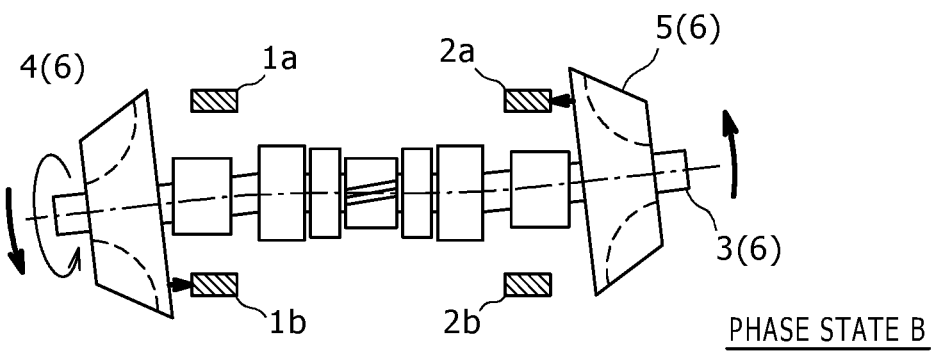

FIG. 2B, FIG. 2C are views showing states of the vibration of the rotor 6 when the rigid mode is excited. As shown in FIG. 2B, FIG. 2C, in the rigid mode, for example, both ends of the rotation shaft 3 are vibrated in the opposite directions while being rotated. Such a vibration mode is called as the rigid mode.

FIG. 2A is a graph showing waveforms of oscillation signals to the magnetic force generators (1a, 1b, 2a, 2b) shown in FIG. 1A in a case where the rigid mode is excited. It should be noted that the oscillation signals are outputted from an oscillation signal generator 10 shown in FIG. 9 to be described later.

A state of FIG. 2B and a state of FIG. 2C are a phase state A and a phase state B, respectively. To which vibration state the oscillation signal to each of the magnetic force generators (1a, 1b, 2a, 2b) corresponds, that is, whether the oscillation signal corresponds to the state of FIG. 2B or corresponds to the state of FIG. 2C is indicated by pointing with arrows in the waveform graph of FIG. 2A.

As shown in FIGS. 2A, 2B, 2C, the pairs of the magnetic force generators arranged at a 180° interval in the rotation direction of the rotor 6, that is, the magnetic force generators 1a and 1b and the magnetic force generators 2a and 2b are respectively alternately operated, and a phase difference between the oscillation signals to the pairs of the magnetic force generators arranged to face each other in the axial direction of the rotor 6, that is, the magnetic force generators 1a and 2a and the magnetic force generators 1b and 2b is reversed (displaced by 180°). From this, the rigid mode can be effectively excited.

Next, a case where the bending mode is excited will be described with reference to FIGS. 3A, 3B, 3C. FIG. 3B, FIG. 3C are views showing states of the vibration of the rotor 6 when the bending mode is excited. As shown in FIG. 3B, FIG. 3C, in the bending mode, for example, both the ends of the rotation shaft 3 are vibrated in the same direction while being rotated. Such a vibration mode is called as the bending mode.

Figure 3A:
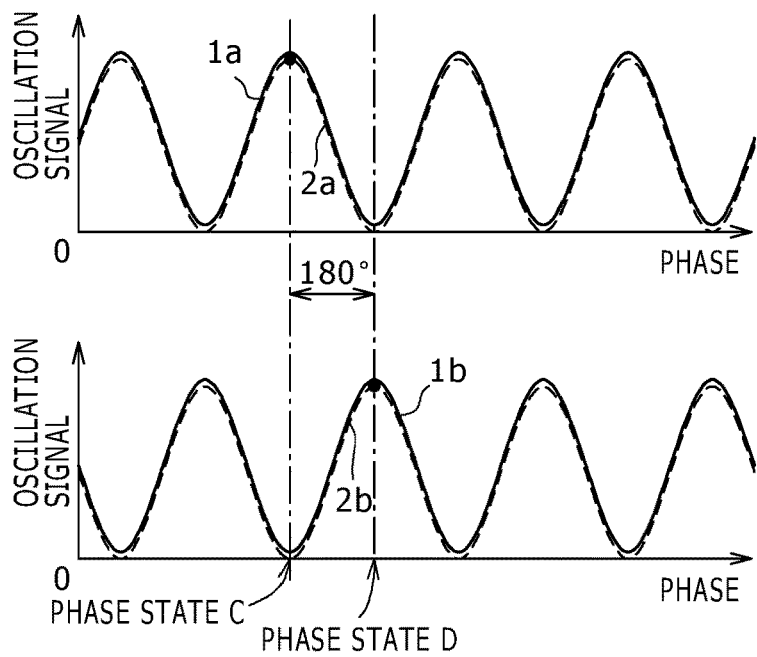
FIG. 3A is a graph showing waveforms of oscillation signals to the magnetic force generators shown in FIG. 1A in a case where a bending mode is excited.
Figure 3B:
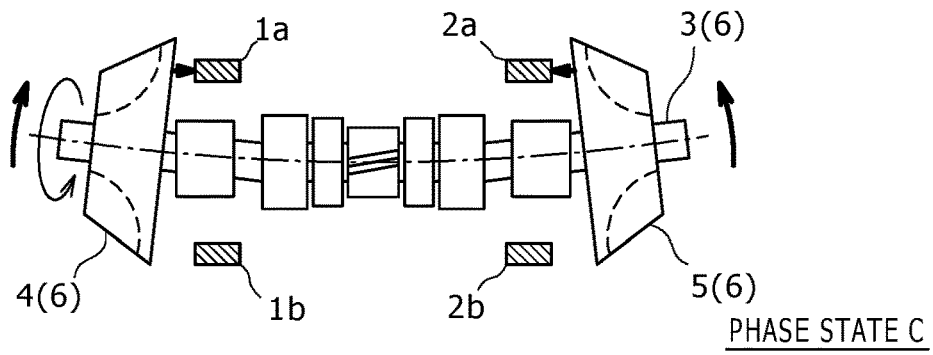
FIG. 3B, FIG. 3C are views showing states of the vibration of the rotor when the bending mode is excited.
Figure 3C:
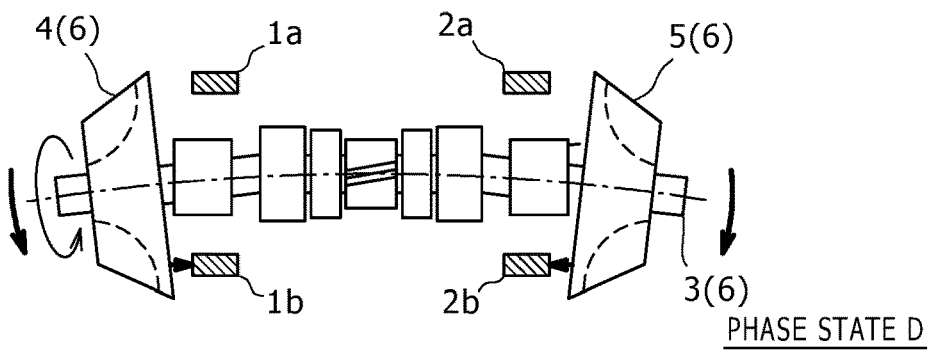

FIG. 3A is a graph showing waveforms of oscillation signals to the magnetic force generators (1a, 1b, 2a, 2b) shown in FIG. 1A in a case where the bending mode is excited. It should be noted that the oscillation signals are outputted from the oscillation signal generator 10 shown in FIG. 9 to be described later.

A state of FIG. 3B and a state of FIG. 3C are a phase state C and a phase state D, respectively. To which vibration state the oscillation signal to each of the magnetic force generators (1a, 1b, 2a, 2b) corresponds, that is, whether the oscillation signal corresponds to the state of FIG. 3B or corresponds to the state of FIG. 3C is indicated by pointing with arrows in the waveform graph of FIG. 3A.

As shown in FIGS. 3A, 3B, 3C, the pairs of the magnetic force generators arranged at a 180° interval in the rotation direction of the rotor 6, that is, the magnetic force generators 1a and 1b and the magnetic force generators 2a and 2b are respectively alternately operated, and the phase difference between the oscillation signals to the pairs of the magnetic force generators arranged to face each other in the axial direction of the rotor 6, that is, the magnetic force generators 1a and 2a and the magnetic force generators 1b and 2b is the same phase. From this, the bending mode can be effectively excited.

Second Embodiment

A dynamic characteristic measurement device according to a second embodiment of the present invention will be described with reference to FIGS. 4A to 6B. It should be noted that description of the same configurations as the first embodiment will be omitted.
<Arrangement of Magnetic Force Generator>

In the present embodiment, two magnetic force generators (1a, 1b) are arranged on the back surface side of an impeller 5 in such a manner that a backward rotation mode and a forward rotation mode can be separately excited as a vibration mode of a rotor 6.

The magnetic force generators (1a, 1b) are arranged on the back surface side of the impeller 5 at a 90° interval in the rotation direction of the rotor 6. Thereby, oscillation force can act on the impeller 5 by the two orthogonal axes perpendicular to the rotation shaft 3. FIG. 4B is an AA arrow view of FIG. 4A.

It should be noted that magnetic force generators may also be arranged on the back surface side of an impeller 4 at a 90° interval in the rotation direction of the rotor 6.
<Oscillation Mode by Magnetic Force Generator>

Next, oscillation modes (the backward rotation mode and the forward rotation mode) by the magnetic force generators (1a, 1b) will be described with reference to FIGS. 5A to 6B.

Figure 5A:
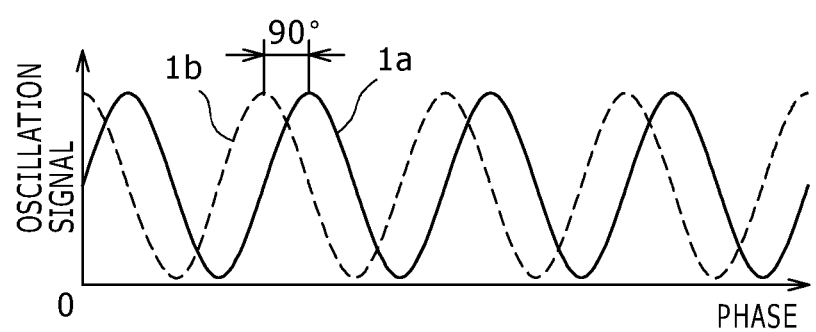
FIG. 5A is a graph showing waveforms of oscillation signals to the magnetic force generators shown in FIG. 4A in a case where a backward rotation mode is excited.
Figure 5B:
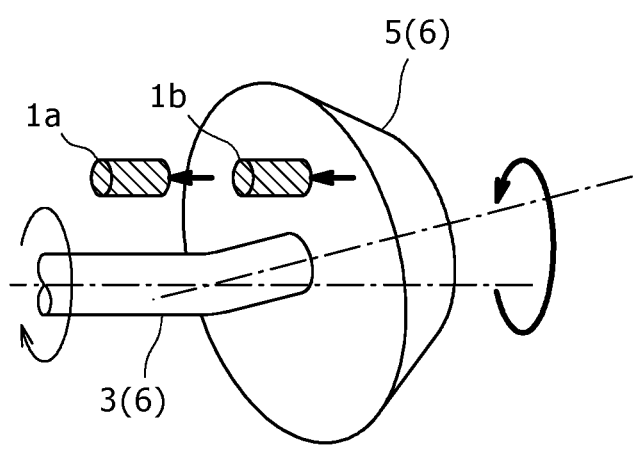
FIG. 5B is a view showing a state of vibration of a rotor when the backward rotation mode is excited.
Figure 6A:
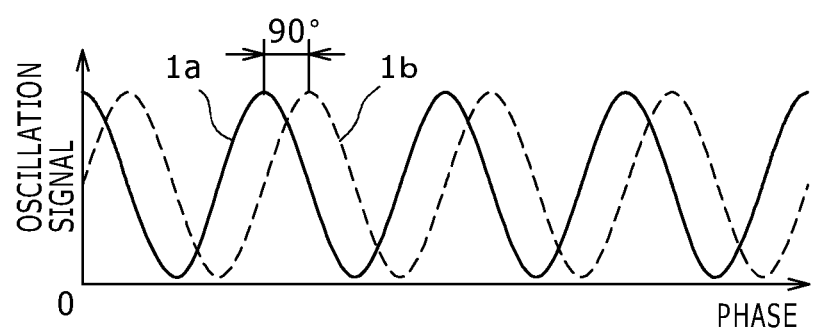
FIG. 6A is a graph showing waveforms of oscillation signals to the magnetic force generators shown in FIG. 4A in a case where a forward rotation mode is excited.
Figure 6B:
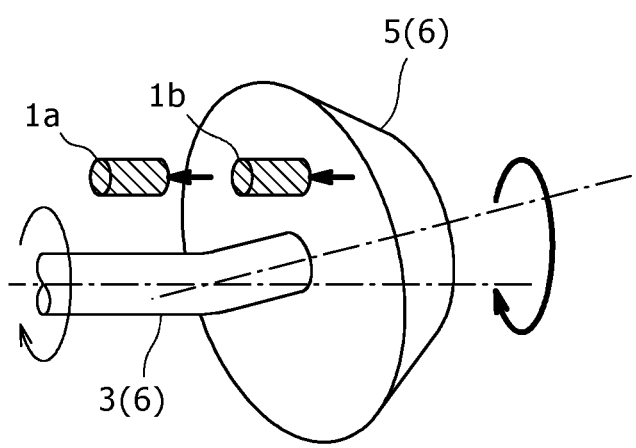
FIG. 6B is a view showing a state of the vibration of the rotor when the forward rotation mode is excited.

The backward rotation mode shown in FIGS. 5A, 5B is a vibration mode in which whirling of the rotation shaft 3 (rotor 6) is in the opposite direction to the rotation direction of the rotation shaft 3 (rotor 6). Meanwhile, the forward rotation mode shown in FIGS. 6A, 6B is a vibration mode in which the whirling of the rotation shaft 3 (rotor 6) is in the same direction as the rotation direction of the rotation shaft 3 (rotor 6).

FIG. 5B is a view showing a state of vibration of the rotor 6 when the backward rotation mode is excited. As shown in FIG. 5B, in the backward rotation mode, the rotation shaft 3 (rotor 6) whirls in the opposite direction to the rotation direction of the rotation shaft 3 (rotor 6). FIG. 6B is a view showing a state of the vibration of the rotor 6 when the forward rotation mode is excited. As shown in FIG. 6B, in the forward rotation mode, the rotation shaft 3 (rotor 6) whirls in the same direction as the rotation direction of the rotation shaft 3 (rotor 6).

FIG. 5A is a graph showing waveforms of oscillation signals to the magnetic force generators (1a, 1b) shown in FIG. 4A in a case where the backward rotation mode is excited. FIG. 6A is a graph showing waveforms of oscillation signals to the magnetic force generators (1a, 1b) shown in FIG. 4A in a case where the forward rotation mode is excited.

As shown in FIGS. 5A to 6B, with the oscillation signal to one of the magnetic force generators (1a, 1b) arranged at a 90° interval in the rotation direction of the rotor 6 (for example, the magnetic force generator 1a) as a basis, a phase of the oscillation signal to the other (for example, the magnetic force generator 1b) is displaced forward or backward by 90°. From this, the forward rotation mode and the backward rotation mode can be effectively excited.

Third Embodiment

A dynamic characteristic measurement device according to the third embodiment of the present invention will be described with reference to FIGS. 7A to 8B. It should be noted that description of the same configurations as the first embodiment will be omitted.
<Arrangement of Magnetic Force Generator>

In the present embodiment, a plurality of magnetic force generators (1a to 1d, 2a to 2d) is arranged on the back surface side of impellers 4, 5 in such a manner that a backward-rotation rigid mode, a forward-rotation rigid mode, a backward-rotation bending mode, and a forward-rotation bending mode are further separately excited as a vibration mode of a rotor 6.

The four magnetic force generators (1a to 1d) are arranged on the back surface side of the impeller 4 at a 90° interval in the rotation direction of the rotor 6. The other set of four magnetic force generators (2a to 2d) is arranged on the back surface side of the impeller 5 at a 90° interval in the rotation direction of the rotor 6. FIG. 7B is an AA arrow view of FIG. 7A.

As well as the above case of the first embodiment, the magnetic force generators (1a, 2a), the magnetic force generators (1b, 2b), and the magnetic force generators (1c, 2c), and the magnetic force generators (1d, 2d) arranged on both sides of a rotation shaft 3 are arranged to face each other in the axial direction of the rotor 6.

It should be noted that arrangement of the magnetic force generators (1a to 1d, 2a to 2d) of the present embodiment includes the arrangement of the magnetic force generators of the first embodiment with which the rigid mode and the bending mode can be separately excited, and the arrangement of the magnetic force generators of the second embodiment with which the backward rotation mode and the forward rotation mode can be separately excited.
<Oscillation Mode by Magnetic Force Generator>

Next, one example of oscillation modes by the magnetic force generators (1a to 1d, 2a to 2d) (forward-rotation rigid mode) will be described with reference to FIGS. 8A, 8B.

Figure 8A:
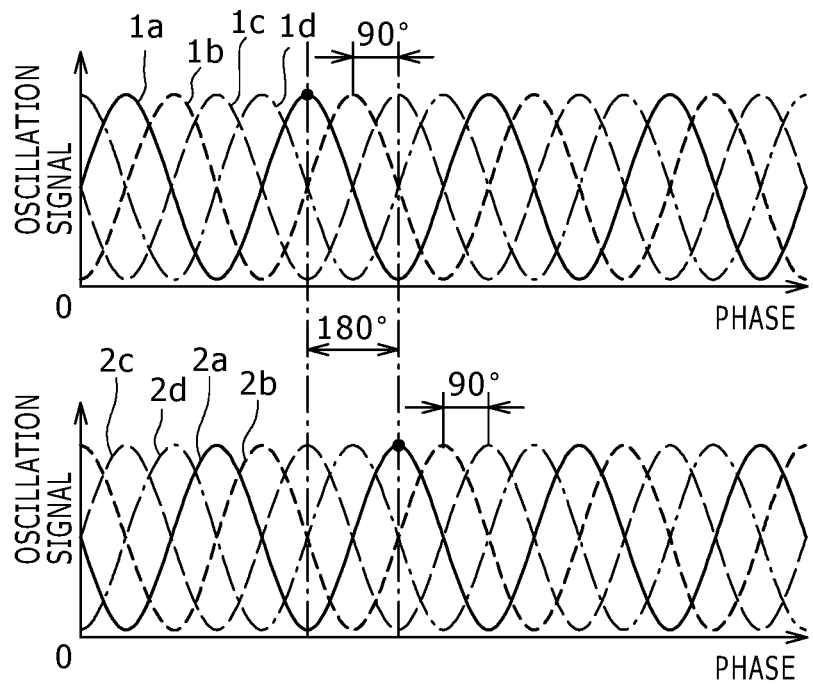
FIG. 8A is a graph showing waveforms of oscillation signals to the magnetic force generators shown in FIG. 7A in a case where a forward-rotation rigid mode is excited.
Figure 8B:
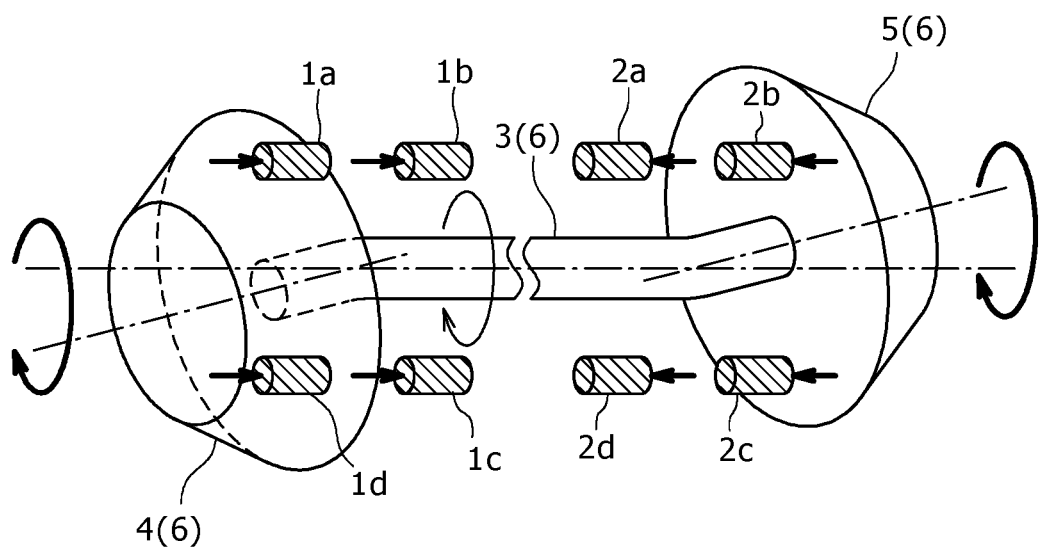
FIG. 8B is a view showing a state of vibration of a rotor when the forward-rotation rigid mode is excited.

The forward-rotation rigid mode shown in FIGS. 8A, 8B is a rigid mode with rotation in the forward rotation direction. It should be noted that the backward-rotation rigid mode is a rigid mode with rotation in the backward rotation direction. The backward-rotation bending mode is a bending mode with rotation in the backward rotation direction. The forward-rotation bending mode is a bending mode with rotation in the forward rotation direction.

FIG. 8B is a view showing a state of the vibration of the rotor when the forward-rotation rigid mode is excited. As shown in FIG. 8B, in the forward-rotation rigid mode, the rotation shaft 3 (rotor 6) whirls in the same direction as the rotation direction of the rotation shaft 3 (rotor 6) while being vibrated in the rigid mode.

Figure 7A:
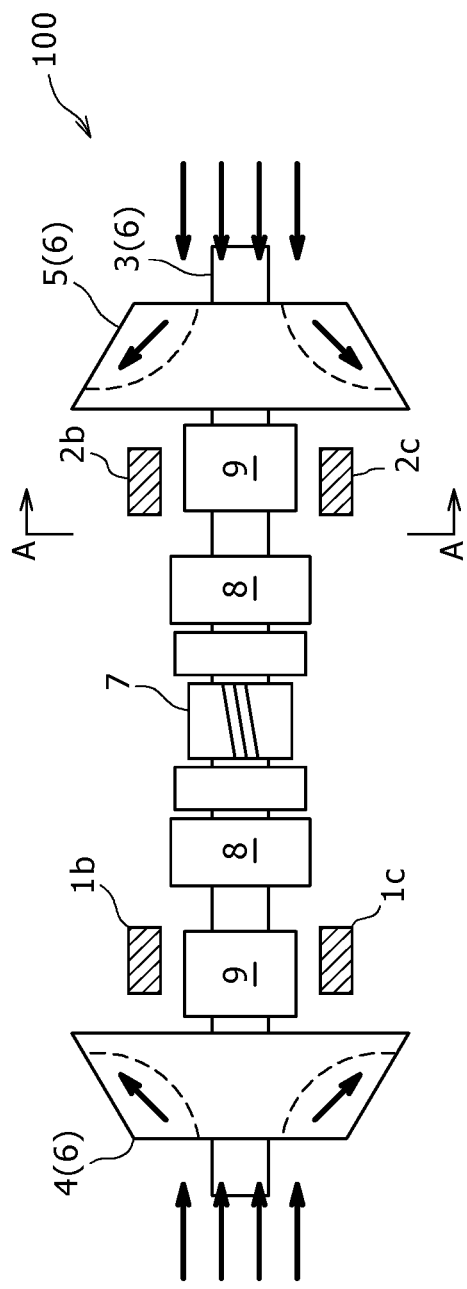
FIG. 7A is an arrangement view of magnetic force generators forming a dynamic characteristic measurement device according to a third embodiment of the present invention.
Figure 7B:
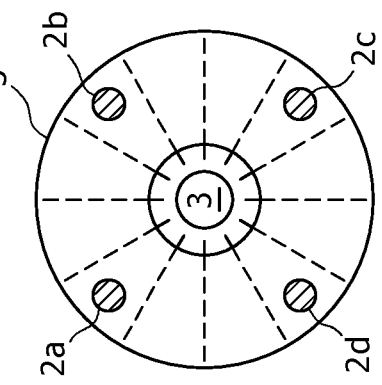
FIG. 7B is an AA arrow view of FIG. 7A.

FIG. 8A is a graph showing waveforms of oscillation signals to the magnetic force generators shown in FIG. 7A in a case where the forward-rotation rigid mode is excited.

As shown in FIGS. 8A, 8B, phases of the oscillation signals to the pairs of the magnetic force generators arranged at a 90° interval in the rotation direction of the rotor 6, that is, the magnetic force generators (1a to 1d) and the magnetic force generators (2a to 2d) are respectively displaced by 90° in the rotation direction to be oscillated (to whirl). From this, the forward rotation mode (or the backward rotation mode) can be effectively excited. A phase difference between the oscillation signals to the pairs of the magnetic force generators arranged to face each other in the axial direction of the rotor 6, that is, the magnetic force generators 1a and 2a, the magnetic force generators 1b and 2b, the magnetic force generators 1c and 2c, and the magnetic force generators 1d and 2d is reversed (or the same phase). From this, the rigid mode (or the bending mode) can be effectively excited. By combining these, the backward-rotation rigid mode, the forward-rotation rigid mode, the backward-rotation bending mode, and the forward-rotation bending mode can be excited.

<System Configuration of Dynamic Characteristic Measurement Device>

Figure 9:
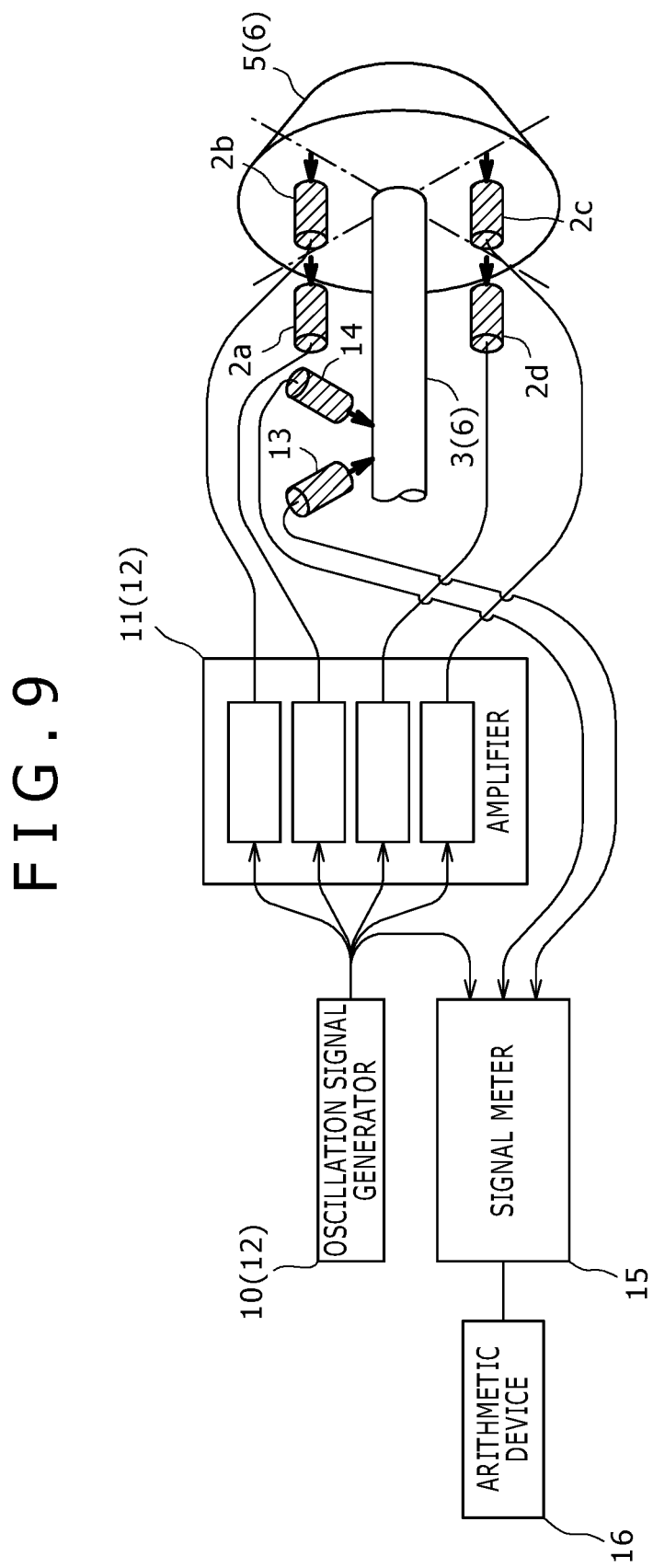
FIG. 9 is a system configuration diagram of the dynamic characteristic measurement device including the magnetic force generators shown in FIG. 7A.
Figure 10:
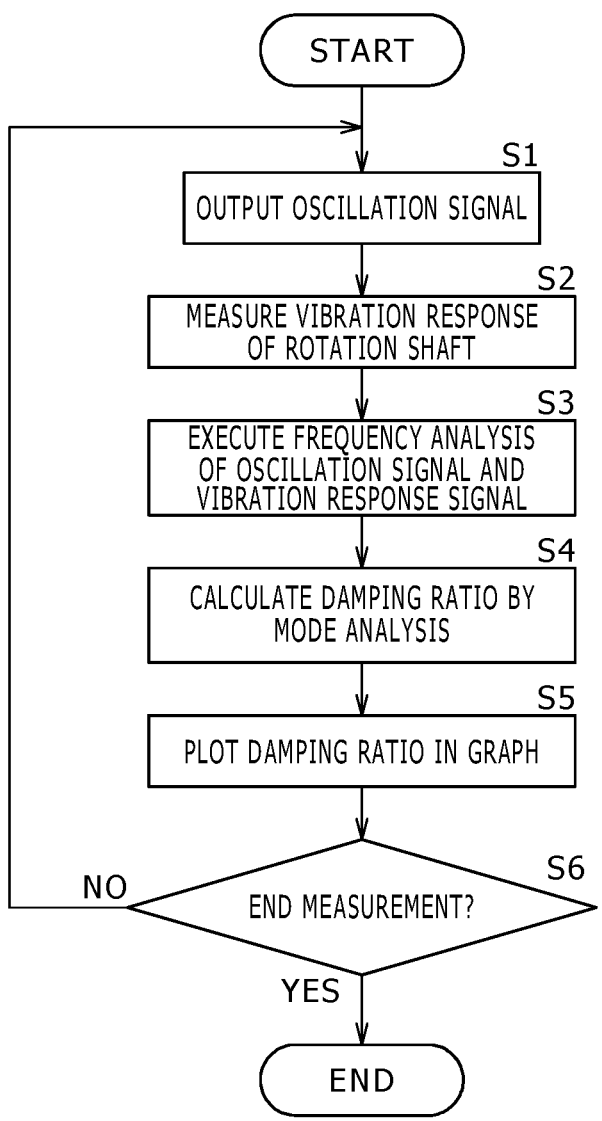
FIG. 10 is a flowchart to measure a dynamic characteristic of the rotor by the dynamic characteristic measurement device.

FIG. 9 is a system configuration diagram of the dynamic characteristic measurement device including the magnetic force generators (1a to 1d, 2a to 2d) shown in FIG. 7A. It should be noted that a configuration of the magnetic force generators (1a to 1d) is the same as a configuration of the magnetic force generators (2a to 2d) in terms that the magnetic force generators are driven by a signal from the oscillation signal generator 10 (oscillation controller 12). Thus, the magnetic force generators (1a to 1d) are not shown in the figure. FIG. 10 is a flowchart to measure a dynamic characteristic of the rotor 6 by the dynamic characteristic measurement device.

As shown in FIG. 9, the dynamic characteristic measurement device includes the magnetic force generators (1a to 1d, 2a to 2d), the oscillation controller 12 that drives these magnetic force generators (1a to 1d, 2a to 2d), vibration sensors (13, 14) that detect vibration of the rotation shaft 3, and an arithmetic device 16. The arithmetic device 16 calculates the dynamic characteristic of the rotor 6 by implementing a frequency analysis and a mode analysis based on the oscillation signals from the oscillation signal generator 10 (oscillation controller 12) and vibration signals (detection signals) from the vibration sensors (13, 14). In the present embodiment, the oscillation controller 12 is formed by the oscillation signal generator 10 and an amplifier 11.

<Flow of Dynamic Characteristic Measurement of Rotor>

As shown in FIG. 10, the oscillation signals are outputted from the oscillation signal generator 10 (S1 (Step 1)), and inputted to the amplifier 11. The amplifier 11 is connected to the magnetic force generators (1a to 1d, 2a to 2d), and the oscillation signals to be inputted to the magnetic force generators (1a to 1d, 2a to 2d) are amplified in this amplifier 11. It should be noted that a method of driving the magnetic force generators (1a to 1d, 2a to 2d) includes for example sweep oscillation in which an oscillation frequency is gradually changed, and impulse oscillation in which a shocking input is added to the impellers 4, 5 (rotor 6).

With the magnetic force (magnetic attractive force) generated by the magnetic force generators (1a to 1d, 2a to 2d), the rotor 6 is oscillated. Vibration responses of the rotor 6 (rotation shaft 3) to this oscillation force are detected by the vibration sensors (13, 14) installed at right angle to each other (S2).

The oscillation signals from the oscillation signal generator 10 are also inputted to a signal meter 15. The vibration signals (vibration response signals) detected by the vibration sensors (13, 14) are taken into the signal meter 15. These signals are sent to the arithmetic device 16.

The arithmetic device 16 calculates a transfer function from the oscillation signal to the vibration response by implementing the frequency analysis of oscillation signal data from the oscillation signal generator 10 and vibration response signal data from the vibration sensors (13, 14) (S3).

In the frequency analysis, an oscillation signal x(t) and a vibration response signal y(t) serving as time history data are converted into input spectrum data X(f) and response spectrum data Y(f) for example by generally known DFT processing (Discrete Fourier Transform), FFT processing (Fast Fourier Transform), or the like. Herein, "t" indicates time and "f" indicates a frequency (Hz).

An example of conversion from the time history data x(t) into the spectrum data X(f) by the DFT processing will be shown by the following equation.

$$X(n) = \sum_{m=0}^{N-1} x(m)\exp\left(-\frac{2\pi j}{N} nm\right) n = 0, \ldots, N-1 \qquad [\text{Equation 1}]$$

Herein, "N" indicates a point of the data serving as an analysis object, "m" indicates a number expressing mth data of a time history data row, "n" indicates a number expressing nth data of a spectrum data row, "π" indicates the circumference of a circle, and "j" indicates an imaginary unit.

A relationship between the time t of the time history data and the data number m is expressed by t=mΔt wherein a time unit of the data is Δt. A relationship between the frequency f of the spectrum data and the data number n is expressed by f=Δfn wherein a frequency unit of the data is Δf=1/(NΔt).

By using the input spectrum data X(f) and the response spectrum data Y(f) obtained by the frequency analysis, a transfer function G(f) is calculated by the following equation.

$$G(f) = \frac{Y(f)}{X(f)} \qquad [\text{Equation 2}]$$

By applying for example the partial iteration method, the ERA method (Eigensystem Realization Algorism), or the like known as a mode analysis method to the calculated transfer function G(f) by the arithmetic device 16, a natural frequency, a damping ratio, and a vibration mode are determined (S4). The damping ratio is one example of the dynamic characteristic of the rotor 6.

The calculated damping ratios of the vibration modes are plotted in a graph (S5). After that, from the calculated damping ratios of the vibration modes, rotation stability of the rotor 6 (shaft system) is evaluated. As an evaluation method of the rotation stability, for example by a graph in which the horizontal axis indicates gas power and the vertical axis indicates the damping ratio, a change in the damping ratio relative to a compressor load can be evaluated (FIG. 11A).

Figure 11A:
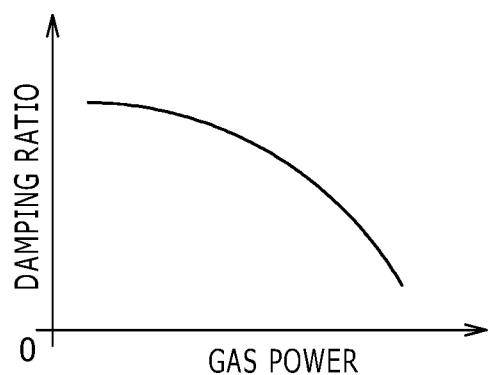
FIGS. 11A, 11B are graphs for illustrating an evaluation method of rotation stability.
Figure 11B:
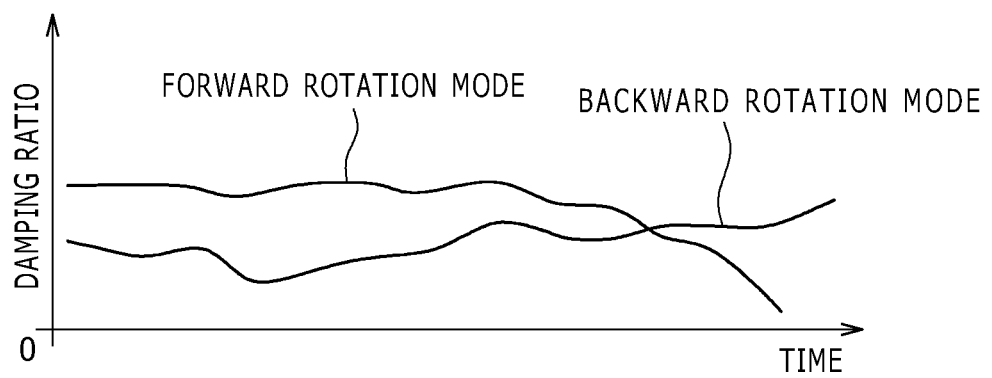

By a graph in which the horizontal axis indicates time and the vertical axis indicates the damping ratio, a state at the time of actual operation of the compressor can be monitored (FIG. 11B).

In FIGS. 11A, 11B, when the damping ratio comes close to zero, such a risk that rotation of the rotor 6 is destabilized is increased. According to the present technique, it can be determined to avoid such an operation state or to provide a measure to increase damping of the rotor 6.

(Operation and Effect)

As described above in the embodiments of the dynamic characteristic measurement device according to the present invention, in the present invention, since the magnetic force generators are arranged on the back surface side of the impeller 4 (5), a fluid flow passage of the ends of the rotation shaft 3 can be maintained and ensured. Since the impeller 4 (5) is attached to the shaft end of the rotation shaft 3 in which vibration magnitude of the rotor 6 is large, oscillation of the impeller 4 (5) with the magnetic force from the magnetic force generators means oscillation of a position where the vibration magnitude of the rotor 6 is large. Thereby, the vibration magnitude of the rotor 6 can be sufficient enough to measure the dynamic characteristic of the rotor. Furthermore, the impeller 4 (5) has a shape of extending from the rotation shaft outward in the radial direction of the impeller. Thus, by oscillating this impeller 4 (5) with the magnetic force from the magnetic force generators, the bending moment by the magnetic force is increased. Thereby, effective oscillation in which the shaft vibration response is increased can be achieved. From these, the vibration mode of the rotor 6 for measuring the dynamic characteristic of the rotor 6 can be effectively excited. As a result, the dynamic characteristic of the rotor 6 can be measured with high precision.

In such a way, according to the present invention, even when the centrifugal rotation machine including the rotor 6 in which the impellers are attached to the shaft ends of the rotation shaft 3 is the dynamic characteristic measurement object for evaluating the rotation stability of the shaft system, the dynamic characteristic of the rotor 6 can be measured with high precision while ensuring the fluid flow passage of the ends of the rotation shaft 3. It should be noted that thereby, the rotation stability of the centrifugal rotation machine can be evaluated with high precision.

As shown in FIGS. 12A, 12B, by attaching the magnetic member or the favorably conductive member to the back surface of the impeller 4 (5), no matter what material the impeller 4 (5) is made of, sufficient oscillation force can be obtained. That is, the dynamic characteristic of the rotor 6 can be measured not depending on the material of the impeller 4 (5).

By arranging the plurality of magnetic force generators in such a manner that the backward-rotation rigid mode, the forward-rotation rigid mode, the backward-rotation bending mode, and the forward-rotation bending mode can be separately excited as the vibration mode of the rotor 6, the dynamic characteristic of the rotor 6 in various vibration modes can be measured.

As shown in FIG. 1A as an example, the magnetic force generators 1a, 1b (2a, 2b) are arranged on the back surface side of the impeller 4 (5) at a 180° interval in the rotation direction of the rotor 6, and the magnetic force generators (1a and 2a, 1b and 2b) arranged on both the sides of the rotation shaft 3 are arranged to face each other in the axial direction of the rotor 6. Thereby, the rigid mode and the bending mode can be effectively excited as the vibration mode of the rotor 6.

As shown in FIG. 4A as an example, for example, the magnetic force generators 1a, 1b are arranged on the back surface side of one impeller 5 at 90° interval in the rotation direction of the rotor 6. Thereby, the backward rotation mode and the forward rotation mode can be effectively excited. It should be noted that for example the two magnetic force generators 1a, 1b are displaced by a gap (phase difference) other than the gap of 180° in the rotation direction of the rotor 6 and arranged on the back surface side of the impeller. Thereby, the backward rotation mode and the forward rotation mode can be separately excited.

Further, as shown in FIGS. 7A, 7B as an example, the four magnetic force generators (1a to 1d, 2a to 2d) are arranged on the back surface side of each of the impellers 4, 5 at 90° interval in the rotation direction of the rotor 6. Further, the magnetic force generators (1a and 2a, 1b and 2b, 1c and 2c, 1d and 2d) arranged on both the sides of the rotation shaft 3 are all arranged to face each other in the axial direction of the rotor 6. From this, the total of four vibration modes including the backward-rotation rigid mode, the forward-rotation rigid mode, the backward-rotation bending mode, and the forward-rotation bending mode can be respectively separately excited.

It should be noted that the present invention can be grasped as a centrifugal rotation machine including the dynamic characteristic measurement device as described above, a rotor in which impellers are attached to shaft ends of a rotation shaft, and the like.

It should be noted that the embodiments disclosed herein are thought to be not restriction but only an example in all aspects. The scope of the present invention is indicated not by the above description but by the claims, and is intended to include equivalent meanings to the claims and all modifications within the scope.

EXPLANATION OF REFERENCE NUMERALS 1a, 1b, 1c, 1d: Magnetic force generator
2a, 2b, 2c, 2d: Magnetic force generator
3: Rotation shaft
4, 5: Impeller
6: Rotor
7: Gear
8: Bearing
9: Seal
12: Oscillation controller
13, 14: Vibration sensor
16: Arithmetic device
100: Built-in gear type centrifugal compressor (centrifugal rotation machine)

The invention claimed is:

1. A dynamic characteristic measurement device of a centrifugal rotation machine including a rotor in which at least one impeller is attached to at least one shaft end of a rotation shaft, the dynamic characteristic measurement device comprising:
an oscillation controller;
a plurality of magnetic force generators arranged on a back surface side of the at least one impeller, wherein the plurality of magnetic force generators oscillate the at least one impeller with magnetic force by an oscillation signal from the oscillation controller in respective different phases, and wherein the oscillation controller drives the plurality of magnetic force generators;
a vibration sensor that detects vibration of the rotation shaft; and an arithmetic device that calculates a dynamic characteristic of the rotor by implementing a frequency analysis and a mode analysis based on the oscillation signal from the oscillation controller and a vibration signal from the vibration sensor.

2. The dynamic characteristic measurement device of the centrifugal rotation machine according to claim 1, wherein the plurality of magnetic force generators is arranged in an outermost peripheral part of the impeller in the radial direction of the impeller.

3. The dynamic characteristic measurement device of the centrifugal rotation machine according to claim 1, comprising a magnetic member or a favorably conductive member attached to a back surface of the impeller.

\* \* \* \* \*